US012578715B2

(12) United States Patent     (10) Patent No.:    US 12,578,715 B2

Kuwahara et al.              (45) Date of Patent:     Mar. 17, 2026

(54) APPARATUS, METHOD, AND SYSTEM FOR WIDE TO SHORT RANGE WIRELESS COMMUNICATION CONVERSION

(71) Applicant: MURATA MACHINERY, LTD., Kyoto (JP)

(72) Inventors: Tetsuya Kuwahara, Kyoto (JP); Munekuni Oshima, Ise (JP); Wataru Kitamura, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 351 days.

(21) Appl. No.: 18/037,434

(22) PCT Filed: Oct. 29, 2021

(86) PCT No.: PCT/JP2021/040053

§ 371 (c)(1),
(2) Date: May 17, 2023

(87) PCT Pub. No.: WO2022/123952

PCT Pub. Date: Jun. 16, 2022

(65) Prior Publication Data

US 2023/0409022 A1     Dec. 21, 2023

(30) Foreign Application Priority Data

Dec. 7, 2020    (JP) ................................. 2020-202954

(51) Int. Cl.
     *G05B 19/418*       (2006.01)
     *H04L 67/12*       (2022.01)

(52) U.S. Cl.
     CPC .......... *G05B 19/4189* (2013.01); *H04L 67/12* (2013.01)

(58) Field of Classification Search
None
See application file for complete search history.

(56) References Cited

U.S. PATENT DOCUMENTS

2004/0077309 A1*   4/2004   Brass ..................... H04B 7/155
                                              455/7
2015/0316924 A1    11/2015   Oh et al.
                  (Continued)

FOREIGN PATENT DOCUMENTS

JP      2006-157582 A    6/2006
JP      2014003516 A     1/2014
                  (Continued)

OTHER PUBLICATIONS

Official Communication issued in International Patent Application No. PCT/JP2021/040053, mailed on Jan. 11, 2022.
                  (Continued)

*Primary Examiner* — Jared I Rutz
(74) *Attorney, Agent, or Firm* — Keating & Bennett, LLP

(57) ABSTRACT

A communication apparatus includes a wide-area wireless communicator to transmit and receive information to and from a transport vehicle via a wireless access point through wide-area wireless communication, a short-range wireless communicator to transmit and receive information to and from a communication device through short-range wireless communication with a communication range narrower than a communication range of the wide-area wireless communication, and a controller configured or programmed to convert the information received by the wide-area wireless communicator from wide-area wireless communication information into short-range wireless communication information, and output the short-range wireless communication information to the short-range wireless communicator, and convert the information received by the short-range wireless communicator from short-range wireless communication information into wide-area wireless communication information, and output the wide-area wireless communication information to the wide-area wireless communicator.

4 Claims, 11 Drawing Sheets

(56)     References Cited

U.S. PATENT DOCUMENTS

| 2018/0191829 A1* | 7/2018 | Morales ................ H04W 4/70 |
| 2019/0059037 A1 | 2/2019 | Nakata |
| 2019/0196456 A1 | 6/2019 | Oh |
| 2021/0057254 A1 | 2/2021 | Kitamura et al. |

FOREIGN PATENT DOCUMENTS

| JP | 2015-082574 A | 4/2015 |
| JP | 5933073 B2 | 6/2016 |
| JP | 2019-117616 A | 7/2019 |
| JP | 2019176262 A | 10/2019 |
| WO | 2019/138802 A1 | 7/2019 |

OTHER PUBLICATIONS

Official Communication issued in corresponding European Patent Application No. 21903056.6 mailed on Sep. 30, 2024, 8 pages.

* cited by examiner

HO_AVBL (P → A)

ES        (P → A)

L_REQ     (P → A)

U_REQ     (P → A)

READY     (P → A)

CS_0      (A → P)

CS_1      (A → P)

VALID     (A → P)

TR_REQ    (A → P)

BUSY      (A → P)

COMPT     (A → P)

CONT      (A → P)

Pre-transfer procedure

Transfer procedure

Post-transfer procedure

| 2 bytes | 2 bytes | 6 bytes | 6 bytes | 6 bytes | 2 bytes | 6 bytes | 0 to 2312 bytes | 4 bytes |
|---|---|---|---|---|---|---|---|---|
| Frame Control | Duration | MAC Address 1 (Destination) | MAC Address 2 (Source) | MAC Address 3 (Router) | Seq Control | MAC Address 4 (AP) | Data (payload) | CRC |

FIG. 5B

| IP header | UDP header | Communication data |
|---|---|---|

FIG. 5C

| Short-range wireless communication frequency band (2.4 GHz or 5.8 GHz) | Short-range wireless communication channel (1 to 100) | Short-range wireless connection destination device ID | Short-range wireless connection source ID | Short-range wireless communication data |
|---|---|---|---|---|

FIG. 5D

| Transmission direction | Input data | Output data |
|---|---|---|

Figure 6:
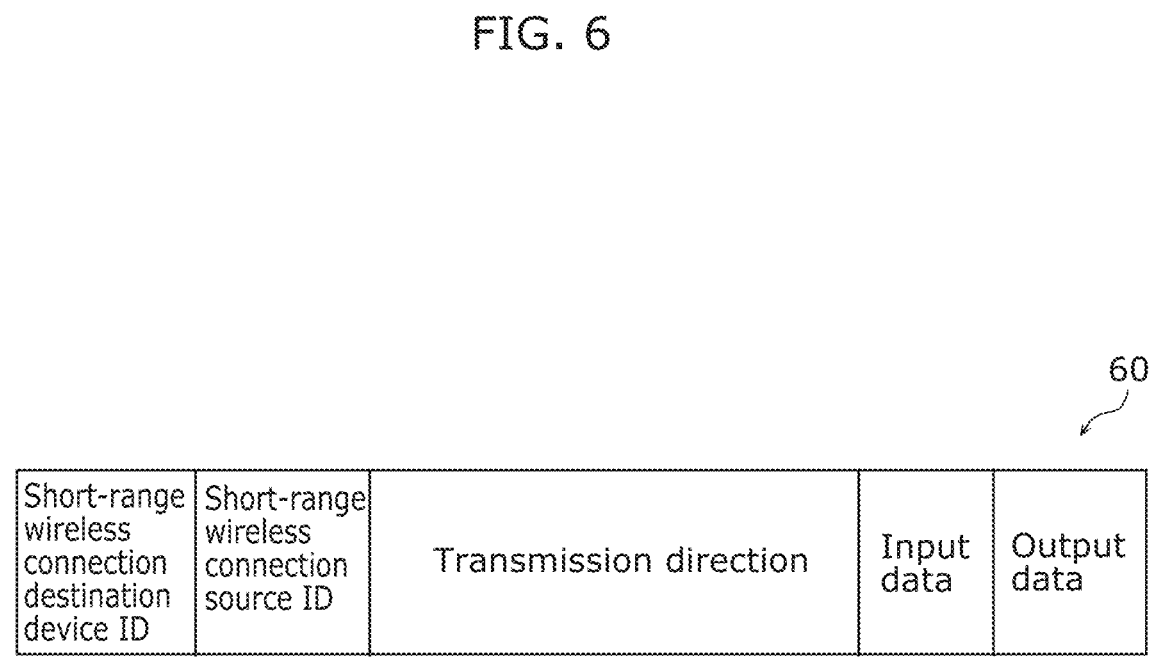

| Short-range wireless connection destination device ID | Short-range wireless connection source ID | Transmission direction | Input data | Output data |
|---|---|---|---|---|

Figure 9:
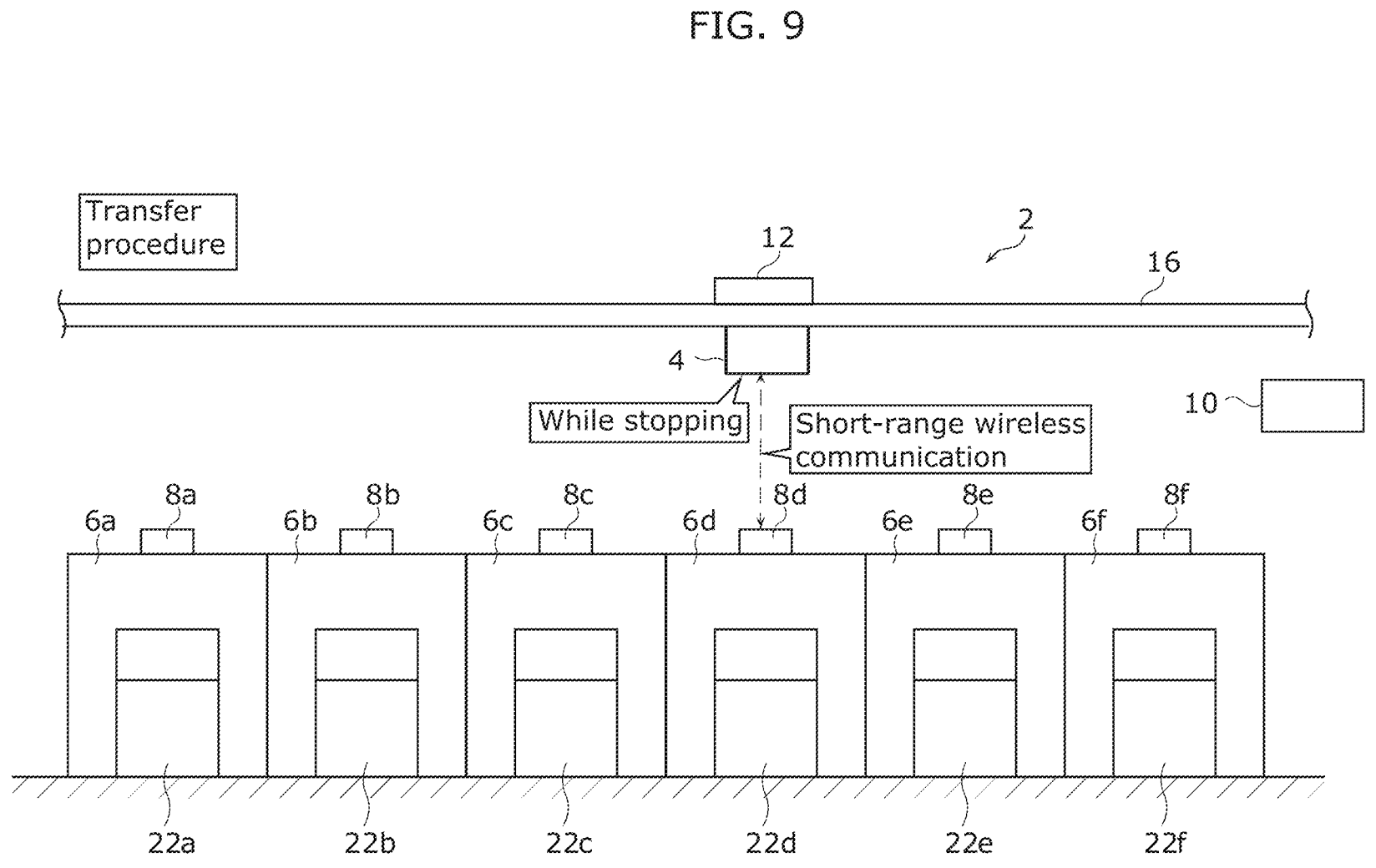

Transfer procedure

16

2

12

10

4

While stopping

Short-range wireless communication 6a    8a    22a
6b    8b    22b
6c    8c    22c
6d    8d    22d
6e    8e    22e
6f    8f    22f

APPARATUS, METHOD, AND SYSTEM FOR WIDE TO SHORT RANGE WIRELESS COMMUNICATION CONVERSION

BACKGROUND OF THE INVENTION

1. Field of the Invention

The present invention relates to a communication apparatus, a method for controlling the communication apparatus, and a communication system.

2. Description of the Related Art

Semiconductor manufacturing systems including over-head-traveling transport vehicles for transporting front opening unified pods (FOUPs) that house semiconductor wafers and semiconductor manufacturing apparatuses for processing the semiconductor wafers have been known (for example, see Japanese Unexamined Patent Application Publication No. 2019-117616).

An E84 communication sequence of the Semiconductor Equipment and Materials International (SEMI) is applied to communication between a transport vehicle and a communication device connected to a placement port of a semiconductor manufacturing apparatus. When an FOUP is transferred between a transport vehicle and a placement port, control signals are exchanged between the transport vehicle and the communication device through E84 communication sequences.

An E84 communication sequence consists of three steps: a pre-transfer procedure, a transfer procedure, and a post-transfer procedure. In the pre-transfer procedure, control signals indicating the start of a transfer of an FOUP from the time onward are exchanged between a transport vehicle and a communication device. In the transfer procedure, control signals for implementing the transfer of the FOUP are exchanged between the transport vehicle and the communication device, and the transfer of the FOUP actually takes place. In the post-transfer procedure, control signals indicating the completion of the transfer of the FOUP are exchanged between the transport vehicle and the communication device. The pre-transfer procedure, the transfer procedure, and the post-transfer procedure are performed in a state in which the transport vehicle is stopped at the position directly above the placement port.

SUMMARY OF THE INVENTION

In a semiconductor manufacturing system, each of transport vehicles is required to simultaneously perform, through wireless communication, E84 communication sequences with communication devices of respective placement ports to which FOUPs are to be transferred. Moreover, depending on a semiconductor manufacturing apparatus, electric power allocated to each of communication devices of respective placement ports is limited, and thus the communication devices are required to operate in a power saving manner. For this reason, short-range wireless communication limiting a communication range to a short range (e.g., within a range of 3 m to 5 m) is adopted as a method for performing wireless communication between a transport vehicle and a communication device for avoiding interference in wireless communication and for performing wireless communication in a power saving manner.

In recent years, it is proposed that, in the above-described semiconductor manufacturing system, the pre-transfer procedure and the post-transfer procedure of an E84 communication sequence be performed while a transport vehicle is traveling to further increase efficiency in manufacturing semiconductors.

However, since the strength of a radio wave output in the short-range wireless communication between a communication device and a transport vehicle is restricted, a problem that the strength of radio wave reception between the communication device and the transport vehicle traveling at a position distant from the position directly above a placement port reduces occurs in the pre-transfer procedure and the post-transfer procedure.

Preferred embodiments of the present invention provide communication apparatuses, methods for controlling the communication apparatuses, and communication systems that are each capable of stabilizing wireless communication between a transport vehicle and a communication device.

A communication apparatus according to one aspect of a preferred embodiment of the present invention is a communication apparatus that relays communication between a transport vehicle to transport an object to be transported and a communication device connected to a transfer apparatus to which the object to be transferred from the transport vehicle is to be transferred and from which the object to be transferred to the transport vehicle is to be transferred. The communication apparatus includes a wide-area wireless communicator to transmit and receive information to and from the transport vehicle via a wide-area wireless communication base station through wide-area wireless communication, a short-range wireless communicator to transmit and receive information to and from the communication device through short-range wireless communication with a communication range narrower than a communication range of the wide-area wireless communication, and a controller configured or programmed to (i) convert the information received by the wide-area wireless communicator from wide-area wireless communication information into short-range wireless communication information, and output the short-range wireless communication information to the short-range wireless communicator, and (ii) convert the information received by the short-range wireless communicator from short-range wireless communication information into wide-area wireless communication information, and output the wide-area wireless communication information to the wide-area wireless communicator.

According to the above aspect, a reduction in the strength of radio wave reception between a transport vehicle and a communication device can be avoided since the wide-area wireless communicator transmits and receives information to and from the transport vehicle via a wide-area wireless communication base station (e.g., a wireless access point) through wide-area wireless communication, although the transport vehicle is traveling at a position distant from the position directly above a transfer apparatus, for example. Therefore, wireless communication between the transport vehicle and the communication device can be stabilized. In addition, the communication device can be operated with low electric power consumption since the short-range wireless communicator transmits and receives information to and from the communication device through short-range wireless communication.

For example, (i) when the transport vehicle transmits information to the communication device while the transport vehicle is traveling in a direction approaching the transfer apparatus before the object is transferred to or from the transfer apparatus or while the transport vehicle is traveling in a direction away from the transfer apparatus after the object is transferred to or from the transfer apparatus, the wide-area wireless communicator may receive information from the transport vehicle via the wide-area wireless communication base station through the wide-area wireless communication, the controller may convert the information received by the wide-area wireless communicator from wide-area wireless communication information into short-range wireless communication information, and output the short-range wireless communication information to the short-range wireless communicator, and the short-range wireless communicator may transmit the information converted by the controller to the communication device through the short-range wireless communication, and (ii) when the communication device transmits information to the transport vehicle while the transport vehicle is traveling in a direction approaching the transfer apparatus before the object is transferred to or from the transfer apparatus or while the transport vehicle is traveling in a direction away from the transfer apparatus after the object is transferred to or from the transfer apparatus, the short-range wireless communicator may receive information from the communication device through the short-range wireless communication, the controller may convert the information received by the short-range wireless communicator from short-range wireless communication information into wide-area wireless communication information, and output the wide-area wireless communication information to the wide-area wireless communicator, and the wide-area wireless communicator may transmit the information converted by the controller to the transport vehicle via the wide-area wireless communication base station through the wide-area wireless communication.

According to the above aspect, wireless communication between the transport vehicle and the communication device can be stabilized although the transport vehicle is traveling at a position distant from the position directly above the transfer apparatus during the pre-transfer procedure or during the post-transfer procedure of an E84 communication sequence, when an E84 communication sequence of SEMI is applied for communication between the transport vehicle and the communication device, for example.

For example, the communication apparatus may further include an obtainer to obtain, while the transport vehicle is traveling, communication status information indicating a communication status between another transport vehicle other than the transport vehicle and the communication device, and the wide-area wireless communicator may transmit, via the wide-area wireless communication base station through the wide-area wireless communication, the communication status information obtained by the obtainer to the transport vehicle that is traveling.

According to the above aspect, a traveling transport vehicle can appropriately change a traveling route based on communication status information indicating a communication status between a transport vehicle other than the traveling transport vehicle and the communication device, when the transport vehicle is performing the transfer procedure of an E84 communication sequence on the traveling route of the traveling transport vehicle.

For example, the communication apparatus may further include an obtainer to obtain, while the transport vehicle is traveling, position information indicating a position of another transport vehicle other than the transport vehicle, and the wide-area wireless communicator may transmit, via the wide-area wireless communication base station through the wide-area wireless communication, the position information obtained by the obtainer to the transport vehicle that is traveling.

According to the above aspect, a traveling transport vehicle can appropriately change a traveling route based on position information indicating a position of a transport vehicle other than the traveling transport vehicle, when the transport vehicle is performing the transfer procedure of an E84 communication sequence on the traveling route of the traveling transport vehicle.

In addition, a method for controlling a communication apparatus according to one aspect of a preferred embodiment of the present invention is a method for controlling a communication apparatus that relays communication between a transport vehicle to transport an object to be transported and a communication device connected to a transfer apparatus to which the object to be transferred from the transport vehicle is to be transferred and from which the object to be transferred to the transport vehicle is to be transferred. The method for controlling the communication apparatus includes: (a) receiving information from the transport vehicle via a wide-area wireless communication base station through wide-area wireless communication, (b) converting the information received in (a) from wide-area wireless communication information into short-range wireless communication information, (c) transmitting the information converted in (b) to the communication device through the short-range wireless communication having a communication range narrower than a communication range of the wide-area wireless communication, (d) receiving information from the communication device through the short-range wireless communication, (e) converting the information received in (d) from short-range wireless communication information into wide-area wireless communication information, and (f) transmitting the information converted in (e) to the transport vehicle via the wide-area wireless communication base station through the wide-area wireless communication.

According to the above aspect, a reduction in the strength of radio wave reception between a transport vehicle and a communication device can be avoided since the wide-area wireless communicator of the communication apparatus transmits and receives information to and from the transport vehicle via a wide-area wireless communication base station (e.g., a wireless access point) through wide-area wireless communication, although the transport vehicle is traveling at a position distant from the position directly above a transfer apparatus, for example. Therefore, wireless communication between the transport vehicle and the communication device can be stabilized. In addition, the communication device can be operated with low electric power consumption since the short-range wireless communicator of the communication apparatus transmits and receives information to and from the communication device through short-range wireless communication.

Moreover, a communication system according to one aspect of a preferred embodiment of the present invention includes a transport vehicle to transport an object to be transported, a communication device connected to a transfer apparatus to which the object to be transferred from the transport vehicle is to be transferred and from which the object to be transferred to the transport vehicle is to be transferred, and a communication apparatus to relay communication between the transport vehicle and the communication device. The transport vehicle includes a first communicator to transmit and receive information to and from the communication apparatus via a wide-area wireless communication base station through wide-area wireless communication. The communication device includes a second communicator to transmit and receive information to and from the communication apparatus through short-range wireless communication with a communication range narrower than a communication range of the wide-area wireless communication. The communication apparatus includes a wide-area wireless communicator to transmit and receive information to and from the first communicator of the transport vehicle via the wide-area wireless communication base station through the wide-area wireless communication, a short-range wireless communicator to transmit and receive information to and from the second communicator of the communication device through the short-range wireless communication, and a controller configured or programmed to (i) convert the information received by the wide-area wireless communicator from wide-area wireless communication information into short-range wireless communication information, and output the short-range wireless communication information to the short-range wireless communicator, and (ii) convert the information received by the short-range wireless communicator from short-range wireless communication information into wide-area wireless communication information, and output the wide-area wireless communication information to the wide-area wireless communicator.

According to the above aspect, a reduction in the strength of radio wave reception between a transport vehicle and a communication device can be avoided since the wide-area wireless communicator of the communication apparatus transmits and receives information to and from the first communicator of a transport vehicle via a wide-area wireless communication base station (e.g., wireless access point) through wide-area wireless communication, although the transport vehicle is traveling at a position distant from the position directly above a transfer apparatus, for example. Therefore, wireless communication between the transport vehicle and the communication device can be stabilized. In addition, the communication device can be operated with low electric power consumption since the short-range wireless communicator of the communication apparatus transmits and receives information to and from the second communicator of the communication device through short-range wireless communication.

Note that preferred embodiments of the present invention can be implemented not only as an apparatus, but also as a method that uses processors configuring the apparatus as steps, a program to cause a computer to execute these steps, a computer-readable recording medium such as a CD-ROM which stores the program, and information, data, or a signal indicating the program. Moreover, the foregoing program, information, data, and signal may be distributed via a communication network such as the Internet.

A communication apparatus, etc. according to one aspect of a preferred embodiment of the present invention can stabilize wireless communication between a transport vehicle and a communication device.

The above and other elements, features, steps, characteristics and advantages of the present invention will become more apparent from the following detailed description of the preferred embodiments with reference to the attached drawings.

6

Figure 2:
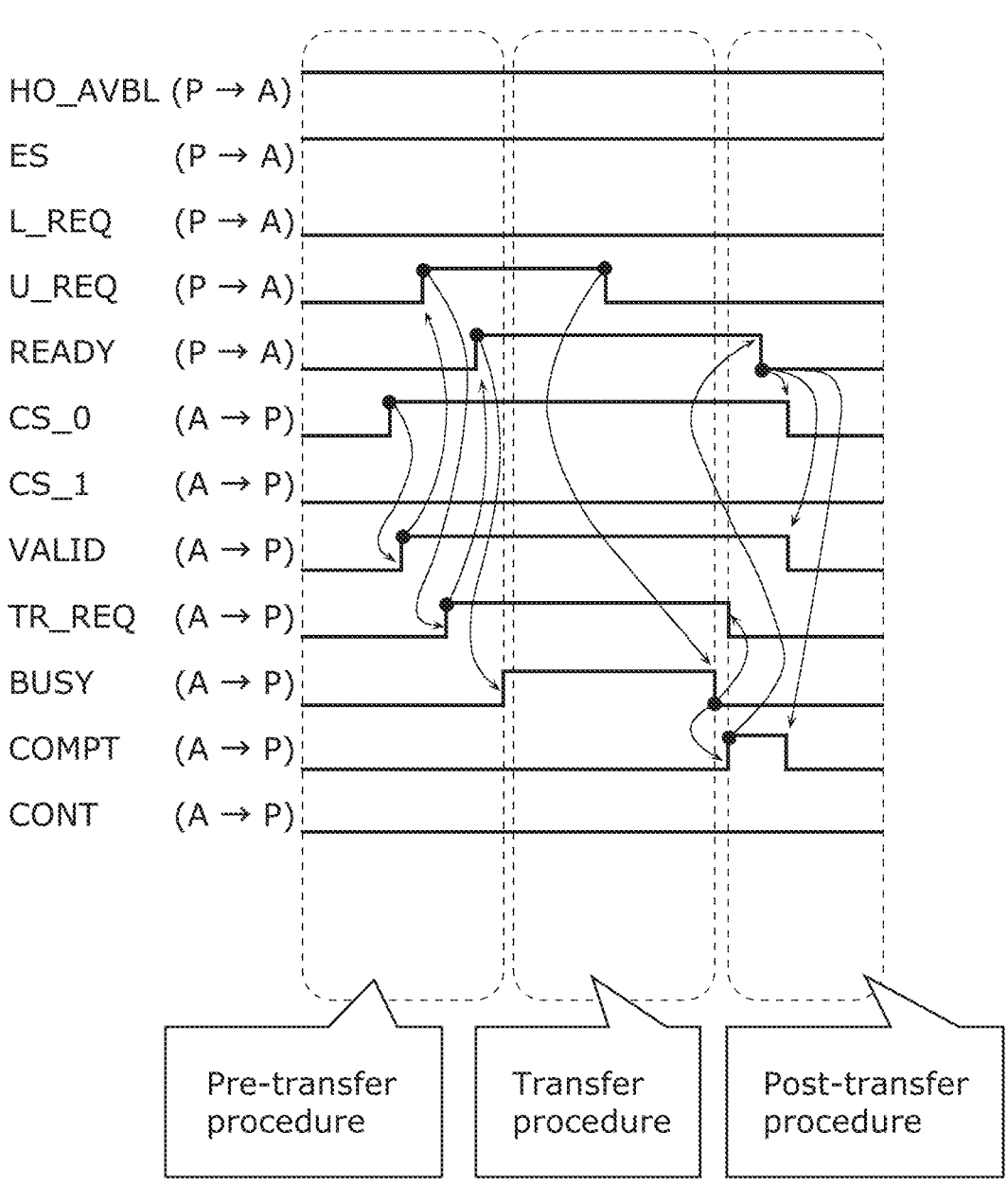

FIG. 2 is a diagram illustrating one example of an E84 communication sequence when an FOUP is picked up.

Figure 3:
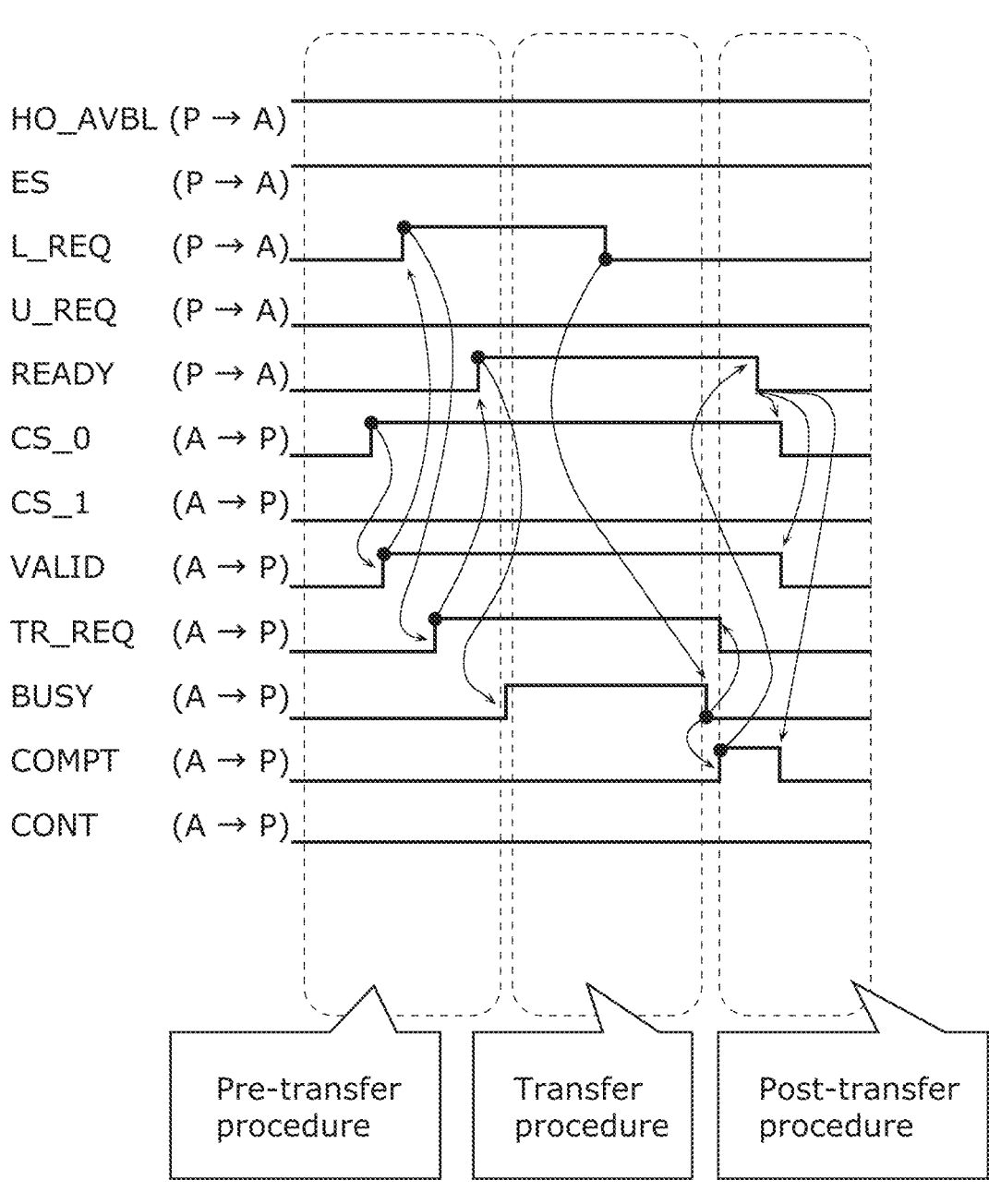

FIG. 3 is a diagram illustrating one example of an E84 communication sequence when the FOUP is unloaded.

Figure 4:
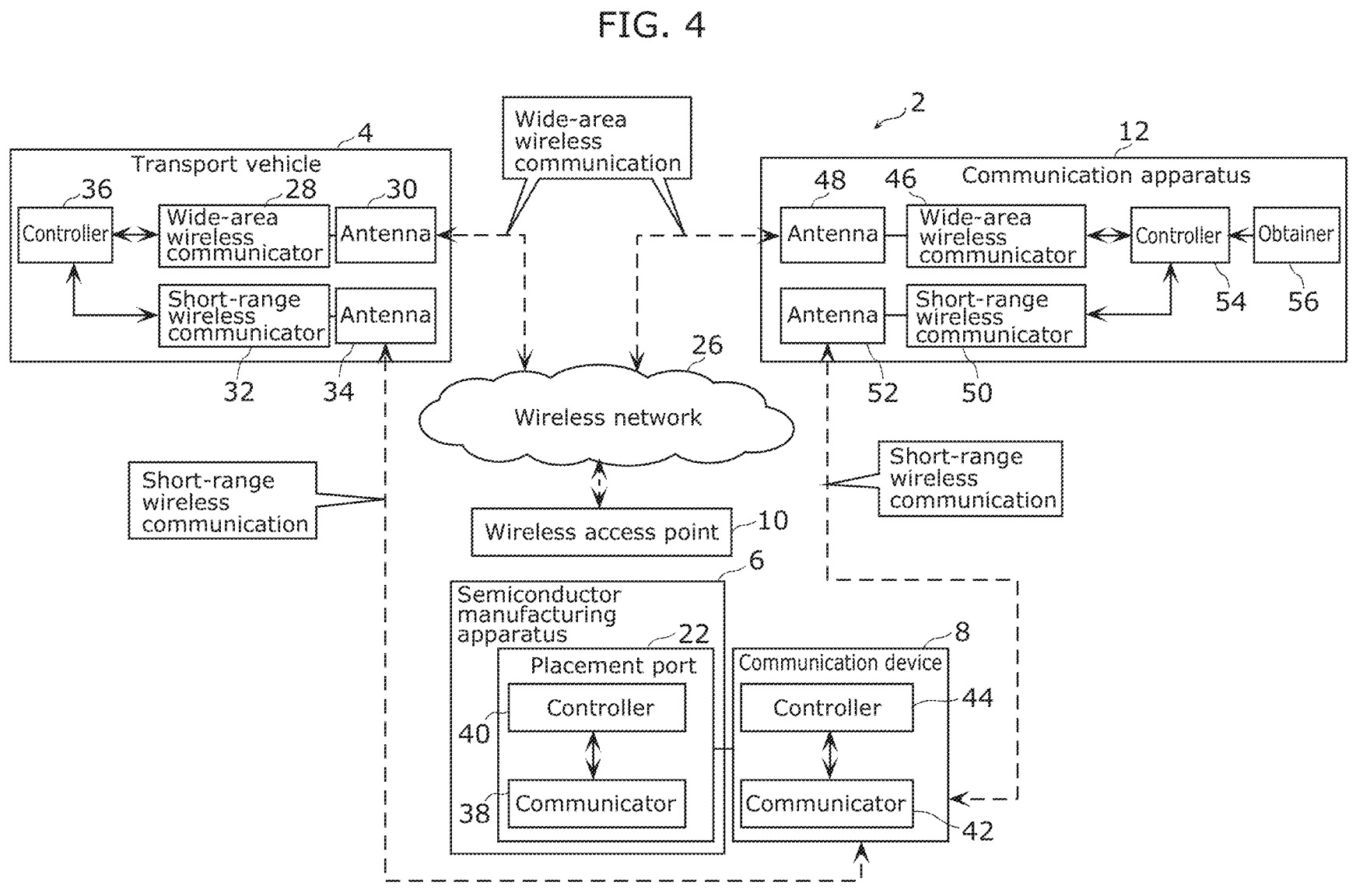

FIG. 4 is a block diagram illustrating a functional configuration of a communication system according to a preferred embodiment of the present invention.

FIGS. 5A to 5D are diagrams illustrating one example of wide-area wireless communication information.

FIG. 6 is a diagram illustrating one example of short-range wireless communication information.

Figure 7:
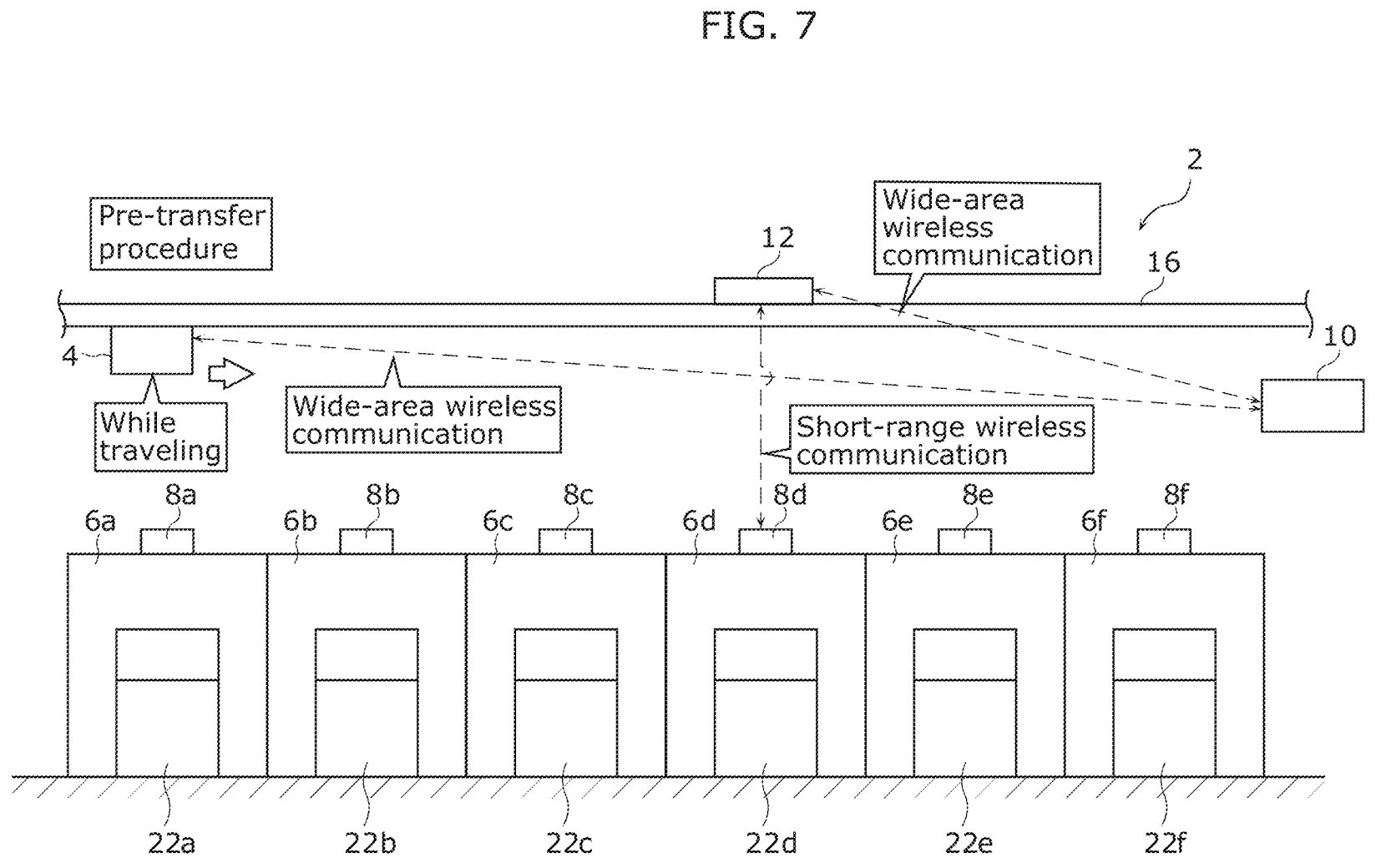

FIG. 7 is a diagram schematically illustrating operations of a communication system according to a preferred embodiment of the present invention during a pre-transfer procedure.

Figure 8:
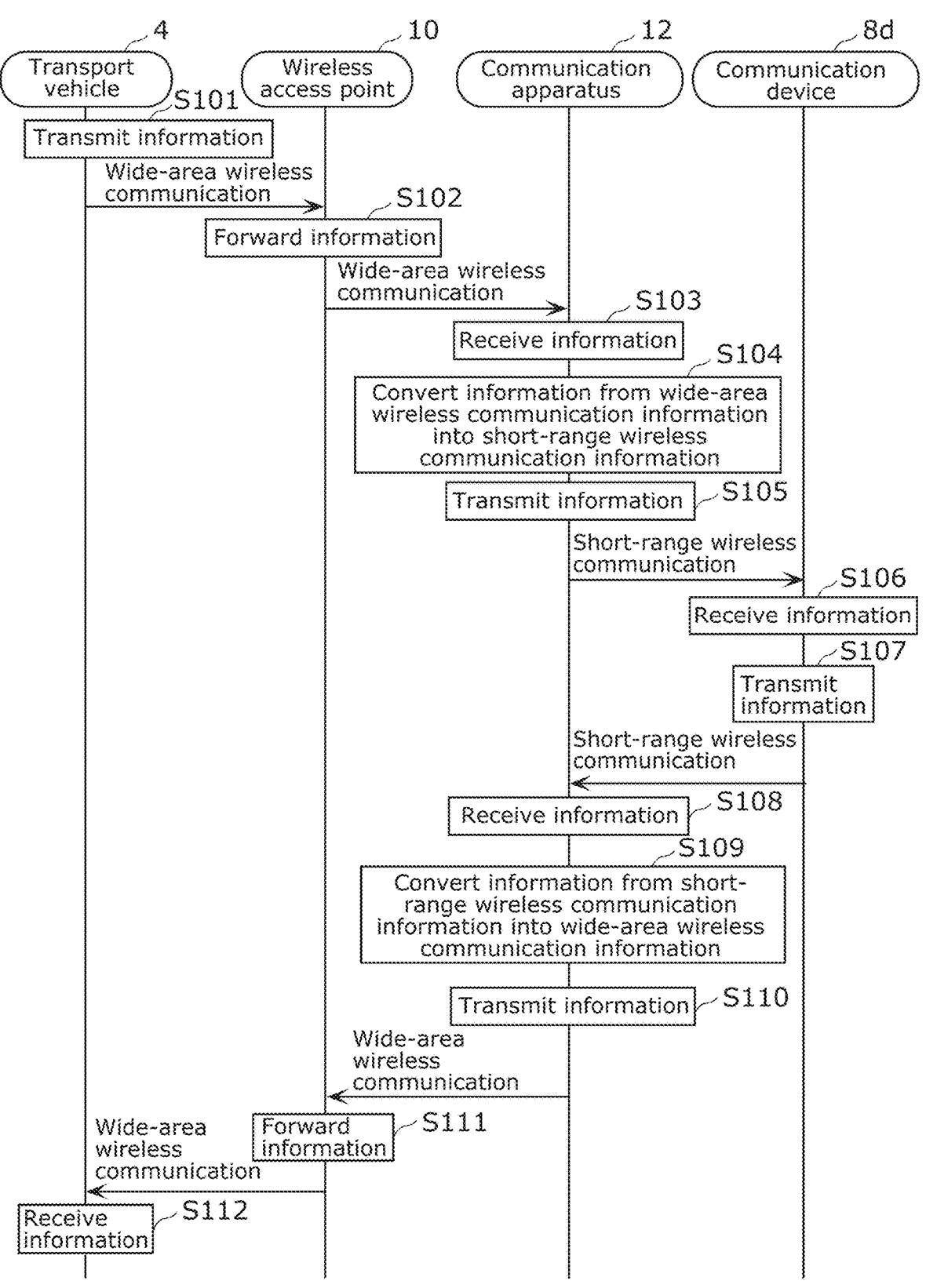

FIG. 8 is a sequence diagram illustrating a flow of operations of a communication system according to a preferred embodiment of the present invention during the pre-transfer procedure.

FIG. 9 is a diagram schematically illustrating operations of a communication system according to a preferred embodiment of the present invention during a transfer procedure.

Figure 10:
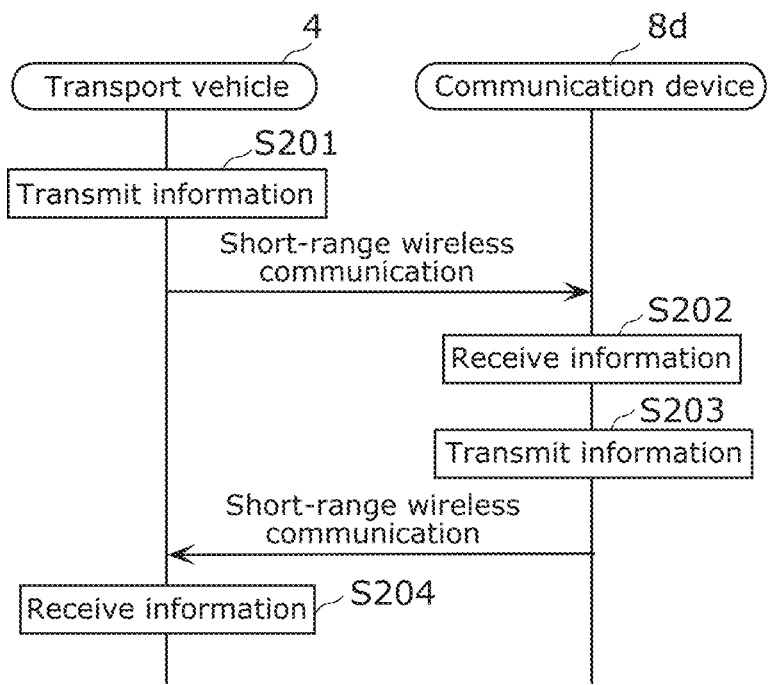

FIG. 10 is a sequence diagram illustrating a flow of operations of a communication system according to a preferred embodiment of the present invention during a transfer procedure.

Figure 11:
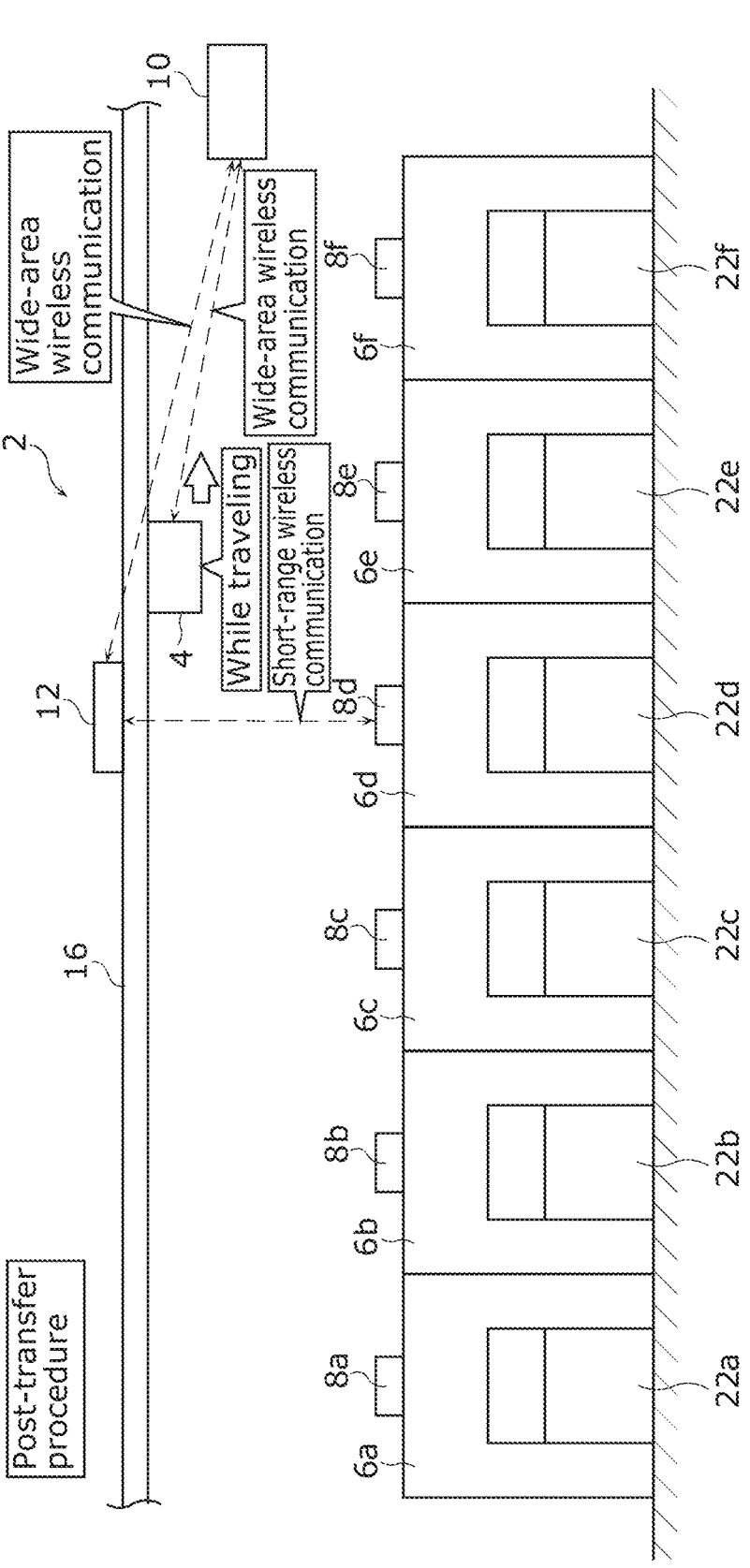

FIG. 11 is a diagram schematically illustrating operations of a communication system according to a preferred embodiment of the present invention during a post-transfer procedure.

DETAILED DESCRIPTION OF THE PREFERRED EMBODIMENTS

Preferred embodiments according to the present invention will be hereinafter described in detail with reference to the drawings. Note that the preferred embodiments below each describe a general or specific example. Therefore, numerical values, shapes, materials, structural elements, the arrangement and connection of the structural elements, steps, the orders of the steps, and the like described in the following preferred embodiments are mere examples, and thus are not intended to limit the present invention. Furthermore, among the structural elements in the preferred embodiments below, those not recited in any one of the independent claims will be described as optional structural elements.

Preferred Embodiment

Figure 1:
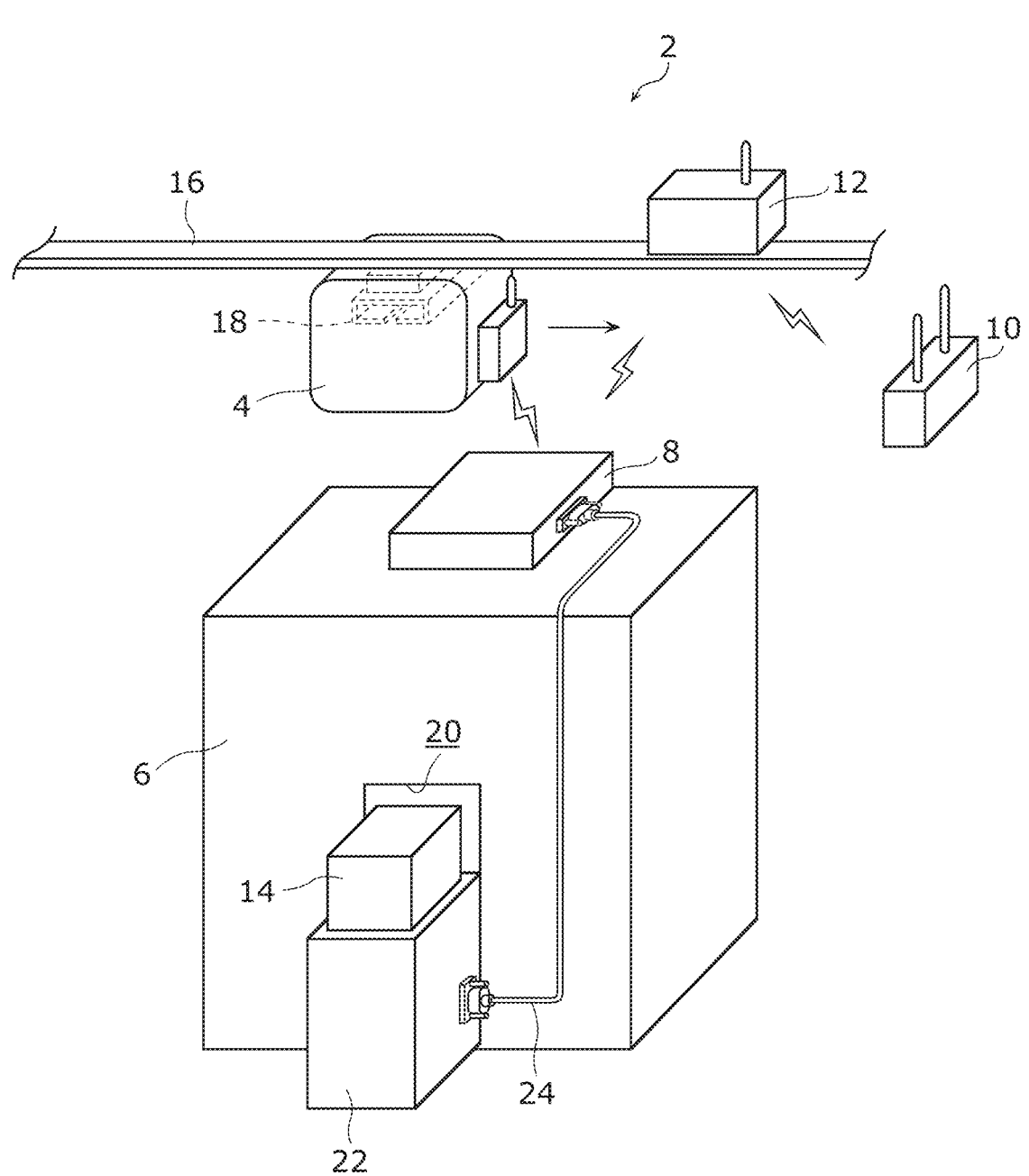
FIG. 1 is a diagram illustrating an overview of a communication system according to a preferred embodiment of the present invention.

First, an overview of communication system 2 according to a preferred embodiment will be described with reference to FIG. 1 through FIG. 3. FIG. 1 is a diagram illustrating an overview of communication system 2 according to the present preferred embodiment. FIG. 2 is a diagram illustrating one example of an E84 communication sequence when FOUP 14 is picked up. FIG. 3 is a diagram illustrating one example of an E84 communication sequence when FOUP 14 is unloaded.

As illustrated in FIG. 1, communication system 2 is a system built inside, for example, a semiconductor manufacturing plant. Communication system 2 includes transport vehicle 4, semiconductor manufacturing apparatus 6, communication device 8, wireless access point 10, and communication apparatus 12.

Transport vehicle 4 is an overhead-traveling transport vehicle to transport a FOUP 14 (one example of an object to be transported) that houses semiconductor wafers. Transport vehicle 4 is the so-called overhead hoist transfer (OHT). Without humans in attendance, transport vehicle 4 travels along rail 16 fixed to the ceiling of the semiconductor manufacturing plant. Note that although a plurality of (e.g., several hundreds of) transport vehicles 4 are arranged in the semiconductor manufacturing plant, FIG. 1 illustrates only one transport vehicle 4 for the convenience of describing the present preferred embodiment.

Transport vehicle 4 is provided with holder 18 to hold FOUP 14 inside transport vehicle 4 which is capable of ascending and descending. For example, when a transfer of FOUP 14 takes place between transport vehicle 4 and placement port 22 (to be described later) of semiconductor manufacturing apparatus 6, holder 18 descends from transport vehicle 4 to the vicinity of placement port 22 in a state in which transport vehicle 4 is stopped directly above placement port 22. When the transfer of FOUP 14 is completed, holder 18 ascends from the vicinity of placement port 22 to transport vehicle 4, and then is retracted into transport vehicle 4.

Semiconductor manufacturing apparatus 6 is an apparatus to process or temporarily store semiconductor wafers housed in FOUP 14, and is arranged directly below rail 16. Semiconductor manufacturing apparatus 6 includes loading/unloading gate 20 to load and unload FOUP 14, and placement port 22 (one example of a transfer apparatus) arranged in the vicinity of loading/unloading gate 20. Placement port 22 is a load port to place FOUP 14. Placement port 22 is used for a transfer of FOUP 14 to or from holder 18 of transport vehicle 4 and is used also to provide and receive FOUP 14 to and from semiconductor manufacturing apparatus 6 via loading/unloading gate 20.

Note that although a plurality of (e.g., several thousands of) semiconductor manufacturing apparatuses 6 are arranged in the semiconductor manufacturing plant, FIG. 1 illustrates only one semiconductor manufacturing apparatus 6 for the convenience of describing the present preferred embodiment. Moreover, although the present preferred embodiment describes the case in which semiconductor manufacturing apparatus 6 includes one placement port 22, semiconductor manufacturing apparatus 6 is not limited to including only one placement port 22. Semiconductor manufacturing apparatus 6 may include a plurality of placement ports 22.

Communication device 8 is a device server to relay communication between transport vehicle 4 and placement port 22 of semiconductor manufacturing apparatus 6. Communication device 8 is arranged on the top surface of semiconductor manufacturing apparatus 6, and is connected to placement port 22 of semiconductor manufacturing apparatus 6 via parallel cable 24. With this, communication device 8 can communicate with placement port 22 of semiconductor manufacturing apparatus 6. An E84 communication sequence of SEMI is applied to communication between communication device 8 and transport vehicle 4. Note that although communication devices 8 as many as placement ports 22 preferably are arranged in the semiconductor manufacturing plant, for example, FIG. 1 illustrates only one communication device 8 for the convenience of describing the present preferred embodiment.

Wireless access point 10 is an access point in a wireless local area network (LAN). Wireless access point 10 relays wide-area wireless communication between transport vehicle 4 and communication apparatus 12. In other words, transport vehicle 4 and communication apparatus 12 are stations in the wireless LAN. Note that the wide-area wireless communication is wireless communication through the wireless LAN, and has a communication range of about 20 m to about 30 m in every direction from wireless access point 10 as the center, for example. Wireless access point 10 is one example of a wide-area wireless communication base station.

Communication apparatus 12 is a relay device to relay communication between transport vehicle 4 and communication device 8. Communication apparatus 12 is arranged above rail 16, for example. Communication apparatus 12 transmits and receives information to and from transport vehicle 4 via wireless access point 10 through wide-area wireless communication. In addition, communication apparatus 12 transmits and receives information to and from communication device 8 through short-range wireless communication. Note that the short-range wireless communication is wireless communication through Bluetooth (registered trademark) Low Energy (BLE), and has a communication range narrower than a communication range of the wide-area wireless communication. The communication range of the short-range wireless communication is about 5 m in every direction from communication apparatus 12 as the center, for example. The short-range wireless communication is also called "proximity wireless communication".

In the above-described communication system 2, control signals (items of information) are exchanged between transport vehicle 4 and communication device 8 through E84 communication sequences when FOUP 14 placed on placement port 22 is to be picked up by transport vehicle 4 and when FOUP 14 is unloaded from transport vehicle 4 to be placed on placement port 22. These E84 communication sequences each adopt an interlock sequence consisting of a plurality of processes in which a shift to a next process does not take place before a particular control signal (e.g., L_REQ) is OFF.

As illustrated in FIG. 2, an E84 communication sequence used to pick up FOUP 14 includes three steps: a pre-transfer procedure, a transfer procedure, and a post-transfer procedure. As illustrated in FIG. 3, an E84 communication sequence used for unloading FOUP 14 includes, as in FIG. 2, three steps: a pre-transfer procedure, a transfer procedure, and a post-transfer procedure.

As illustrated in FIG. 2 and FIG. 3, in the pre-transfer procedure, control signals indicating the start of a transfer of FOUP 14 from the time onward are exchanged between transport vehicle 4 and communication device 8. In the transfer procedure, control signals for implementing the transfer of FOUP 14 are exchanged between transport vehicle 4 and communication device 8, and the transfer of FOUP 14 actually takes place. In the post-transfer procedure, control signals indicating the completion of the transfer of FOUP 14 are exchanged between transport vehicle 4 and communication device 8.

The pre-transfer procedure is implemented while transport vehicle 4 is traveling in a direction approaching the position directly above placement port 22 to which FOUP 14 is to be transferred. The transfer procedure is implemented after transport vehicle 4 arrives at the position directly above placement port 22 to which FOUP 14 is to be transferred and in a state in which transport vehicle 4 is stopped at the position. The post-transfer procedure is implemented while transport vehicle 4 is traveling in a direction away from the position directly above placement port 22 to which FOUP 14 has been transferred.

A functional configuration of communication system 2 according to the present preferred embodiment will be described with reference to FIG. 4 through FIG. 6. FIG. 4 is a block diagram illustrating the functional configuration of communication system 2 according to the present preferred embodiment. FIGS. 5A to 5D are diagrams illustrating one example of wide-area wireless communication information. FIG. 6 is a diagram illustrating one example of short-range wireless communication information.

As illustrated in FIG. 4, transport vehicle 4, wireless access point 10, and communication apparatus 12 are connected to wireless network 26. Wireless network 26 is a wireless LAN that conforms to, for example, IEEE 802.11 series, and is built by Wi-Fi (registered trademark) of the 2.4 GHz band or the 5 GHz band.

Transport vehicle 4 includes wide-area wireless communicator 28 (one example of a first communicator), antenna 30, short-range wireless communicator 32, antenna 34, and controller 36.

Wide-area wireless communicator 28 transmits and receives information to and from communication apparatus 12 via wireless access point 10 through wide-area wireless communication. Antenna 30 is an antenna for wide-area wireless communication, and is connected to wide-area wireless communicator 28.

Short-range wireless communicator 32 transmits and receives information to and from communication device 8 through short-range wireless communication. Antenna 34 is an antenna for short-range wireless communication, and is connected to short-range wireless communicator 32.

Controller 36 controls wide-area wireless communicator 28 and short-range wireless communicator 32 to perform various kinds of processes. Specifically, controller 36 controls short-range wireless communicator 32 such that short-range wireless communication is performed between short-range wireless communicator 32 and communication device 8 immediately before transport vehicle 4 arrives at the position directly above placement port 22 to which FOUP 14 is to be transferred. In addition, when the position of placement port 22 to which FOUP 14 is to be transferred by transport vehicle 4 and the position at which transport vehicle 4 is traveling are within a predetermined range, controller 36 may control short-range wireless communicator 32 such that short-range wireless communication is performed between short-range wireless communicator 32 and communication device 8 without the use of communication apparatus 12. In this case, electric power consumption of communication apparatus 12 can be reduced. Note that controller 36 is implemented by, for example, a processor loading and executing a software program stored in a storage medium such as a hard disk or a semiconductor memory.

Placement port 22 of semiconductor manufacturing apparatus 6 includes communicator 38 and controller 40.

Communicator 38 transmits and receives information to and from communication device 8 via parallel cable 24 (see FIG. 1).

Controller 40 controls communicator 38 to perform various kinds of processes. Specifically, controller 40 performs interlock processes to transfer FOUP 14 (see FIG. 1) to or from transport vehicle 4. In addition, controller 40 performs a process of providing and receiving FOUP 14 to and from semiconductor manufacturing apparatus 6 via loading/unloading gate 20 (see FIG. 1). Note that controller 40 is implemented by, for example, a processor loading and executing a software program stored in a storage medium such as a hard disk or a semiconductor memory.

Communication device 8 includes communicator 42 (one example of a second communicator) and controller 44.

Communicator 42 transmits and receives information to and from placement port 22 via parallel cable 24. In addition, communicator 42 transmits and receives information to and from each of transport vehicle 4 and communication apparatus 12 through short-range wireless communication.

Controller 44 controls communicator 42 to perform various kinds of processes. Note that controller 44 is implemented by, for example, a processor loading and executing a software program stored in a storage medium such as a hard disk or a semiconductor memory.

Communication apparatus 12 includes wide-area wireless communicator 46, antenna 48, short-range wireless communicator 50, antenna 52, controller 54, and obtainer 56.

Wide-area wireless communicator 46 transmits and receives information to and from transport vehicle 4 via wireless access point 10 through wide-area wireless communication. Antenna 48 is an antenna for wide-area wireless communication, and is connected to wide-area wireless communicator 46.

Short-range wireless communicator 50 transmits and receives information to and from communication device 8 through short-range wireless communication. Antenna 52 is an antenna for short-range wireless communication, and is connected to short-range wireless communicator 50. Note that although communication apparatus 12 in this preferred embodiment includes only a single set of short-range wireless communicator 50 and antenna 52, the number of sets of short-range wireless communicator 50 and antenna 52 is not limited to a single set. For example, when information is simultaneously transmitted and received to and from a plurality of communication devices 8 through short-range communication, communication apparatus 12 may include a plurality of sets of short-range wireless communicator 50 and antenna 52.

Controller 54 controls wide-area wireless communicator 46 and short-range wireless communicator 50 to perform various kinds of processes. Specifically, controller 54 converts information received by wide-area wireless communicator 46 from wide-area wireless communication information into short-range wireless communication information, and outputs the short-range wireless communication to short-range wireless communicator 50. Conversely, controller 54 converts information received by short-range wireless communicator 50 from short-range wireless communication information into wide-area wireless communication information, and outputs the wide-area wireless communication information to wide-area wireless communicator 46. Note that controller 54 is implemented by, for example, a processor loading and executing a software program stored in a storage medium such as a hard disk or a semiconductor memory.

The wide-area wireless communication information here is, for example, data frame 58 as shown in FIG. 5A. Data frame 58 shown in FIG. 5A includes the following fields: Frame Control, Duration, MAC Address 1 through 3, Seq control, MAC Address 4, Data, and CRC. The field of Data shown in FIG. 5A includes the following fields shown in FIG. 5B: IP header, UDP header, and Communication data. Furthermore, the field of Communication data shown in FIG. 5B includes the following fields shown in FIG. 5C: Short-range wireless communication frequency band, Short-range wireless communication channel, Short-range wireless connection destination device ID, Short-range wireless connection source ID, and Short-range wireless communication data. Moreover, the field of Short-range wireless communication data shown in FIG. 5C includes the following fields shown in FIG. 5D: Transmission direction, Input data, and Output data.

The short-range wireless communication information here is, for example, data frame 60 as shown in FIG. 6, for example. Data frame 60 shown in FIG. 6 includes the following fields: Short-range wireless connection destination device ID, Short-range wireless connection source ID, Transmission direction, Input data, and Output data.

For example, when wide-area wireless communicator 46 receives data frame 58 shown in FIG. 5A, controller 54 extracts, from data frame 58 received by wide-area wireless communicator 46, the fields of Short-range wireless connection destination device ID, Short-range wireless connection source ID, Transmission direction, Input data, and Output data shown in FIGS. 5C and 5D to generate data frame 60 shown in FIG. 6. As described above, controller 54 converts data frame 58 that is wide-area wireless communication information into data frame that is short-range wireless communication information.

Conversely, when, for example, short-range wireless communicator 50 receives data frame 60 shown in FIG. 6, controller 54 extracts, from data frame 60 received by short-range wireless communicator 50, the fields of Short-range wireless connection destination device ID, Short-range wireless connection source ID, Transmission direction, Input data, and Output data to generate data frame 58 shown in FIG. As described above, controller 54 converts data frame 60 that is short-range wireless communication information into data frame 58 that is wide-area wireless communication information.

Obtainer 56 obtains, while transport vehicle 4 is traveling, communication status information indicating a communication status between a transport vehicle (not illustrated) other than transport vehicle 4 and communication device 8. Obtainer 56 also obtains, while transport vehicle 4 is traveling, position information indicating the position of the transport vehicle other than transport vehicle 4. Obtainer 56 may obtain communication status information and position information from either wide-area wireless communicator 46 or short-range wireless communicator 50, or may obtain the communication status information and the position information from a higher-level controller (not illustrated) controlling over communication system 2.

Operations of communication system 2 during a pre-transfer procedure will be described with reference to FIG. 7 and FIG. 8. FIG. 7 is a diagram schematically illustrating operations of communication system 2 according to the present preferred embodiment during the pre-transfer procedure. FIG. 8 is a sequence diagram illustrating a flow of the operations of communication system 2 according to the present preferred embodiment during the pre-transfer procedure.

As illustrated in FIG. 7, the case in which semiconductor manufacturing apparatuses 6a, 6b, 6c, 6d, 6e, and 6f (6a through 6f) are arranged side by side in the stated order will be hereinafter considered. Semiconductor manufacturing apparatuses 6a, 6b, 6c, 6d, 6e, and 6f include placement ports 22a, 22b, 22c, 22d, 22e, and 22f (22a through 22f), respectively. Placement ports 22a, 22b, 22c, 22d, 22e, and 22f are connected with communication devices 8a, 8b, 8c, 8d, 8e, and 8f (8a through 8f), respectively.

The following describes the case in which transport vehicle 4 transfers FOUP 14 (see FIG. 1) to or from placement port 22d of semiconductor manufacturing apparatus 6d. As illustrated in FIG. 7, the pre-transfer procedure is implemented while transport vehicle 4 is traveling in a direction approaching the position directly above placement port 22d to which FOUP 14 is to be transferred. In the pre-transfer procedure, items of information indicating the start of transferring of FOUP 14 from the time onward are exchanged between transport vehicle 4 and communication device 8d.

Note that, through the short-range wireless communication, communication apparatus 12 is capable of transmitting and receiving information to and from each of communication devices 8a through 8f, for example. In addition, through the wide-area wireless communication, communication apparatus 12 is capable of transmitting and receiving information to and from transport vehicles 4 traveling on the semiconductor manufacturing apparatus 6a side (the left side in FIG. 7) relative to the position directly above semiconductor manufacturing apparatus 6d and transport vehicles 4 traveling on the semiconductor manufacturing apparatus 6f side (the right side in FIG. 7) relative to the position directly above semiconductor manufacturing apparatus 6d.

First, the case in which transport vehicle 4 transmits information to communication device 8d will be described. As illustrated in FIG. 8, wide-area wireless communicator 28 of transport vehicle 4 transmits information (wide-area wireless communication information) to communication apparatus 12 through the wide-area wireless communication (S101). Wireless access point 10 forwards the information from this transport vehicle 4 to communication apparatus 12 through the wide-area wireless communication (S102).

Wide-area wireless communicator 46 of communication apparatus 12 receives the information forwarded from wireless access point 10 through the wide-area wireless communication (S103). Controller 54 of communication apparatus 12 converts the information received by wide-area wireless communicator 46 from wide-area wireless communication information into short-range wireless communication information (S104), and outputs the short-range wireless communication information to short-range wireless communicator 50. Short-range wireless communicator 50 of communication apparatus 12 transmits the information (short-range wireless communication information) converted by controller 54 to communication device 8d through short-range wireless communication (S105).

Communicator 42 of communication device 8d receives the information transmitted from communication apparatus 12 through the short-range wireless communication (S106).

Next, the case in which communication device 8d transmits information to transport vehicle 4 will be described. As illustrated in FIG. 8, communicator 42 of communication device 8d transmits information (short-range wireless communication information) to communication apparatus 12 through the short-range wireless communication (S107).

Short-range wireless communicator 50 of communication apparatus 12 receives the information transmitted from communication device 8d through the short-range wireless communication (S108). Controller 54 of communication apparatus 12 converts the information received by short-range wireless communicator 50 from short-range wireless communication information into wide-area wireless communication information (S109), and outputs the wide-area wireless communication information to wide-area wireless communicator 46. Wide-area wireless communicator 46 of communication apparatus 12 transmits the information (wide-area wireless communication information) converted by controller 54 to transport vehicle 4 through the wide-area wireless communication (S110).

Wireless access point 10 forwards the information that has been transmitted from communication apparatus 12 in step S110 to transport vehicle 4 through the wide-area wireless communication (S111). Wide-area wireless communicator 28 of transport vehicle 4 receives the information forwarded from wireless access point 10 through wide-area wireless communication (S112).

Operations of communication system 2 during a transfer procedure will be described with reference to FIG. 9 and FIG. 10. FIG. 9 is a diagram schematically illustrating operations of communication system 2 according to the present preferred embodiment during the transfer procedure. FIG. 10 is a sequence diagram illustrating a flow of the operations of communication system 2 according to the present preferred embodiment during the transfer procedure.

As described above, the following describes the case in which transport vehicle 4 transfers FOUP 14 to or from placement port 22d of semiconductor manufacturing apparatus 6d. As illustrated in FIG. 9, the transfer procedure is implemented in a state in which transport vehicle 4 is stopped at the position directly above placement port 22d to which FOUP 14 is to be transferred. In the transfer procedure, items of information for implementing a transfer of FOUP 14 are exchanged between transport vehicle 4 and communication device 8d, and the transfer of FOUP 14 actually takes place.

First, the case in which transport vehicle 4 transmits information to communication device 8d will be described. As illustrated in FIG. 10, short-range wireless communicator 32 of transport vehicle 4 transmits information (short-range wireless communication information) to communication device 8d through the short-range wireless communication (S201). Communicator 42 of communication device 8d receives the information transmitted from transport vehicle 4 through the short-range wireless communication (S202).

Next, the case in which communication device 8d transmits information to transport vehicle 4 will be described. As illustrated in FIG. 10, communicator 42 of communication device 8d transmits information (short-range wireless communication information) to transport vehicle 4 through the short-range wireless communication (S203). Short-range wireless communicator 32 of transport vehicle 4 receives the information transmitted from communication device 8d through the short-range wireless communication (S204).

Operations of communication system 2 during a post-transfer procedure will be described with reference to FIG. 11. FIG. 11 is a diagram schematically illustrating operations of communication system 2 according to the present preferred embodiment during the post-transfer procedure.

As illustrated in FIG. 11, the post-transfer procedure is implemented while transport vehicle 4 is traveling in a direction away from the position directly above placement port 22d to which FOUP 14 has been transferred. As described with reference to FIG. 8, in the post-transfer procedure, items of information indicating the completion of a transfer of FOUP 14 are exchanged between transport vehicle 4 and communication device 8d via wireless access point 10 and communication apparatus 12.

As has been described above, obtainer 56 obtains, while transport vehicle 4 is traveling, communication status information indicating communication statuses between a transport vehicle other than transport vehicle 4 and communication devices 8a through 8f. Wide-area wireless communicator 46 transmits, in response to a request from the traveling transport vehicle 4, items of communication status information and/or items of position information obtained by the above-mentioned obtainer 56 to the traveling transport vehicle 4 via wireless access point 10 through the wide-area wireless communication.

With this, for example, when another transport vehicle is stopped at the position directly above placement port 22d to perform a transfer procedure while transport vehicle 4 is traveling in a direction approaching the position directly above placement port 22d to perform a pre-transfer procedure, the traveling transport vehicle 4 can appropriately change the traveling route based on the items of communication status information and/or the items of position information so as to bypass the position directly above placement port 22d.

In communication system 2 according to the present preferred embodiment, when transport vehicle 4 is traveling at a position distant from the position directly above placement port 22 during, for example, the pre-transfer procedure or the post-transfer procedure of an E84 communication sequence, wide-area wireless communicator 46 of communication apparatus 12 transmits and receives information to and from transport vehicle 4 via wireless access point 10 through the wide-area wireless communication. With this, it is possible to avoid a reduction in the strength of radio wave reception between transport vehicle 4 and communication device 8, and thus wireless communication between transport vehicle 4 and communication device 8 can be stabilized.

In addition, communication device 8 can be operated with low electric power consumption since short-range wireless communicator 50 of communication apparatus 12 transmits and receives information to and from communication device 8 through the short-range wireless communication. With this, communication device 8 can be operated by a power source (for example, 24 V, 100 mA) supplied via a programmed input/output (PI/O) provided in, for example, semiconductor manufacturing apparatus 6.

Moreover, since information is transmitted and received between transport vehicle 4 and communication device 8 through the short-range wireless communication during the transfer procedure of an E84 communication sequence, interference in wireless communication can be avoided even if each of a plurality of transport vehicles 4 simultaneously communicates with a plurality of communication devices 8 in a wireless manner.

Hereinbefore, communication apparatuses according to preferred embodiments of the present invention have been described based on the above-described preferred embodiments. However, the present invention is not limited to the above-described preferred embodiments. The present invention also encompasses preferred embodiments achieved by applying modifications conceivable to those skilled in the art to the above-described preferred embodiments, and different preferred embodiments achieved by optionally combining the structural elements of the above-described preferred embodiments.

Although the above-described preferred embodiments have adopted Wi-Fi (registered trademark) as wide-area wireless communication, wide-area wireless communication is not limited to the foregoing. For example, private long-term evolution (LTE), local 5G that locally uses the fifth-generation mobile communication system, or the like may be used. When the foregoing wide-area wireless communications are used, wide-area wireless communicator 28 and antenna 30 of transport vehicle 4, wide-area wireless communicator 46 and antenna 48 of communication apparatus 12, and communicator 42 of communication device 8 conform to a communication standard of each wide-area wireless communication.

In addition, although, in operations of communication system 2 during the transfer procedure, short-range wireless communicator 32 included in transport vehicle 4 transmits and receives information (short-range wireless communication information) to and from communication device 8 through the short-range wireless communication for exchanging, between transport vehicle 4 and communication device 8, items of information for implementing a transfer of FOUP 14, the same communication method as used during the pre-transfer procedure and the post-transfer procedure may be applied. In other words, in operations of communication system 2 during the transfer procedure, transport vehicle 4 exchanges items of information with communication apparatus 12 via wireless access point 10 through the wide-area wireless communication, and communication apparatus 12 performs the short-range wireless communication with communication device 8. Accordingly, transport vehicle 4 need not include short-range wireless communicator 32, and is capable of performing interlock communication with communication device 8 through the wide-area wireless communication. Moreover, the manufacturing cost and design complexity of transport vehicle 4 can be reduced.

It should be noted that each of the structural elements in the above-described preferred embodiments may be configured as dedicated hardware or may be implemented by executing a software program suitable for the structural element. Each element may be implemented as a result of a program execution unit, such as a CPU or processor or the like, loading and executing a software program stored in a storage medium such as a hard disk or semiconductor memory.

The communication systems according to preferred embodiments of the present invention are applicable to semiconductor manufacturing systems and the like to transport FOUPs using transport vehicles that travel along a rail fixed to a ceiling, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A communication system comprising:
a transport vehicle to transport an object;
a communication device connected to a transfer apparatus to which the object is to be transferred or from which the object is to be transferred; and
a communication apparatus to relay communication between the transport vehicle and the communication device, wherein
the communication apparatus includes:
a wide-area wireless communicator to transmit and receive information to and from the transport vehicle via a wide-area wireless communication base station through wide-area wireless communication;
a short-range wireless communicator to transmit and receive information to and from the communication device through short-range wireless communication with a communication range narrower than a communication range of the wide-area wireless communication; and
a controller configured or programmed to:
(i) convert the information received by the wide-area wireless communicator from wide-area wireless communication information into short-range wireless communication information, and output the short-range wireless communication information to the short-range wireless communicator; and
(ii) convert the information received by the short-range wireless communicator from short-range wireless communication information into wide-area wireless communication information, and output the wide-area wireless communication information to the wide-area wireless communicator,
(i) when the transport vehicle transmits information to the communication device while the transport vehicle is traveling in a direction approaching the transfer apparatus before the object is transferred to or from the transfer apparatus or while the transport vehicle is traveling in a direction away from the transfer apparatus after the object is transferred to or from the transfer apparatus:
the wide-area wireless communicator is operable to receive information from the transport vehicle via the wide-area wireless communication base station through the wide-area wireless communication;
the controller is configured or programmed to convert the information received by the wide-area wireless communicator from wide-area wireless communication information into short-range wireless communication information, and output the short-range wireless communication information to the short-range wireless communicator; and
the short-range wireless communicator is operable to transmit the information converted by the controller to the communication device through the short-range wireless communication; and
(ii) when the communication device transmits information to the transport vehicle while the transport vehicle is traveling in the direction approaching the transfer apparatus before the object is transferred to or from the transfer apparatus or while the transport vehicle is traveling in the direction away from the transfer apparatus after the object is transferred to or from the transfer apparatus:
the short-range wireless communicator is operable to receive information from the communication device through the short-range wireless communication;
the controller is configured or programmed to convert the information received by the short-range wireless communicator from short-range wireless communication information into wide-area wireless communication information, and output the wide-area wireless communication information to the wide-area wireless communicator; and
the wide-area wireless communicator is operable to transmit the information converted by the controller to the transport vehicle via the wide-area wireless communication base station through the wide-area wireless communication.
2. The communication system according to claim 1, wherein:
the transport vehicle is a first transport vehicle;
the communication system further includes a second transport vehicle other than the first transport vehicle;
the communication apparatus further includes an obtainer to obtain, while the first transport vehicle is traveling, communication status information indicating a communication status between the second transport vehicle other and the communication device; and
the wide-area wireless communicator is operable to transmit, to the first transport vehicle via the wide-area wireless communication base station through the wide-area wireless communication, the communication status information obtained by the obtainer.
3. The communication system according to claim 1, wherein:

the transport vehicle is a first transport vehicle;

the communication system further includes a second transport vehicle other than the first transport vehicle;

the communication apparatus further includes an obtainer to obtain, while the first transport vehicle is traveling, position information indicating a position of the second transport vehicle; and the wide-area wireless communicator is operable to transmit, to the first transport vehicle via the wide-area wireless communication base station through the wide-area wireless communication, the position information obtained by the obtainer.

4. A communication method for a communication system that includes a transport vehicle to transport an object, a communication device connected to a transfer apparatus to which the object is to be transferred or from which the object is to be transferred, and a communication apparatus to relay communication between the transport vehicle and the communication device, the communication method comprising:

(a) receiving, by the communication apparatus, information from the transport vehicle via a wide-area wireless communication base station through wide-area wireless communication while the transport vehicle is traveling in a direction approaching the transfer apparatus before the object is transferred to or from the transfer apparatus or while the transport vehicle is traveling in a direction away from the transfer apparatus after the object is transferred to or from the transfer apparatus;

(b) converting, by the communication apparatus, the information received in (a) from wide-area wireless communication information into short-range wireless communication information;

(c) transmitting the information converted in (b) from the communication apparatus to the communication device through the short-range wireless communication with a communication range narrower than a communication range of the wide-area wireless communication;

(d) receiving, by the communication apparatus, information from the communication device through the short-range wireless communication;

(e) converting, by the communication apparatus, the information received in (d) from short-range wireless communication information into wide-area wireless communication information; and (f) transmitting the information converted in (e) from the communication apparatus to the transport vehicle via the wide-area wireless communication base station through the wide-area wireless communication while the transport vehicle is traveling in the direction approaching the transfer apparatus before the object is transferred to or from the transfer apparatus or while the transport vehicle is traveling in the direction away from the transfer apparatus after the object is transferred to or from the transfer apparatus.

* * * * *